United States Patent [19]
Enomoto et al.

[11] Patent Number: 5,150,233
[45] Date of Patent: Sep. 22, 1992

[54] LIQUID CRYSTAL DEVICE AND DISPLAY APPARATUS WITH A THREE-LAYERED ELECTRODE OF ITO, MOLYBDENUM, AND ALUMINUM

[75] Inventors: Takashi Enomoto, Zama; Toshifumi Yoshioka, Hiratsuka; Naoya Nishida, Hadano, all of Japan

[73] Assignee: Canon Kabushiki Kaisha, Tokyo, Japan

[21] Appl. No.: 658,501

[22] Filed: Feb. 21, 1991

[30] Foreign Application Priority Data

Feb. 26, 1990 [JP] Japan ................. 2-042611

[51] Int. Cl.⁵ .............................. G02F 1/1343
[52] U.S. Cl. ............................ 359/54; 359/87
[58] Field of Search ............. 350/336; 359/54, 87

[56] References Cited

U.S. PATENT DOCUMENTS

| | | | |
|---|---|---|---|
| 4,853,296 | 8/1989 | Fukuyoshi | 428/623 |
| 4,859,036 | 8/1989 | Yamanaka et al. | 350/336 |
| 4,937,423 | 6/1990 | Yoshihara et al. | 219/121.72 |
| 5,000,545 | 3/1991 | Yoshioka et al. | 350/336 |
| 5,007,716 | 4/1991 | Hanyu et al. | 350/336 |

FOREIGN PATENT DOCUMENTS

| | | |
|---|---|---|
| 0062289 | 10/1982 | European Pat. Off. . |
| 263676 | 11/1987 | Japan . |
| 289533 | 11/1988 | Japan . |
| 8702508 | 5/1988 | Netherlands .......... 350/336 |

Primary Examiner—Stanley D. Miller
Assistant Examiner—Anita Pellman Gross
Attorney, Agent, or Firm—Fitzpatrick, Cella, Harper & Scinto

[57] ABSTRACT

A liquid crystal device if formed by disposing a liquid crystal between a pair of oppositely disposed electrodes, at least one of which has a laminated structure including a first layer of ITO (indium tin oxide), a second layer of Mo (molybdenum) or its alloy, and a third layer of Al (aluminum) or its alloy, disposed in the order named. Because of the Mo-based second layer, the ITO layer is protected during development of a photoresist layer formed on the Al-based third layer even if some pinholes are present in the Al-based third layer. The Mo-based second layer can be etched by an etchant for the Al-based third layer so that the entire process is not complicated because of the provision of the Mo-based second layer.

15 Claims, 8 Drawing Sheets

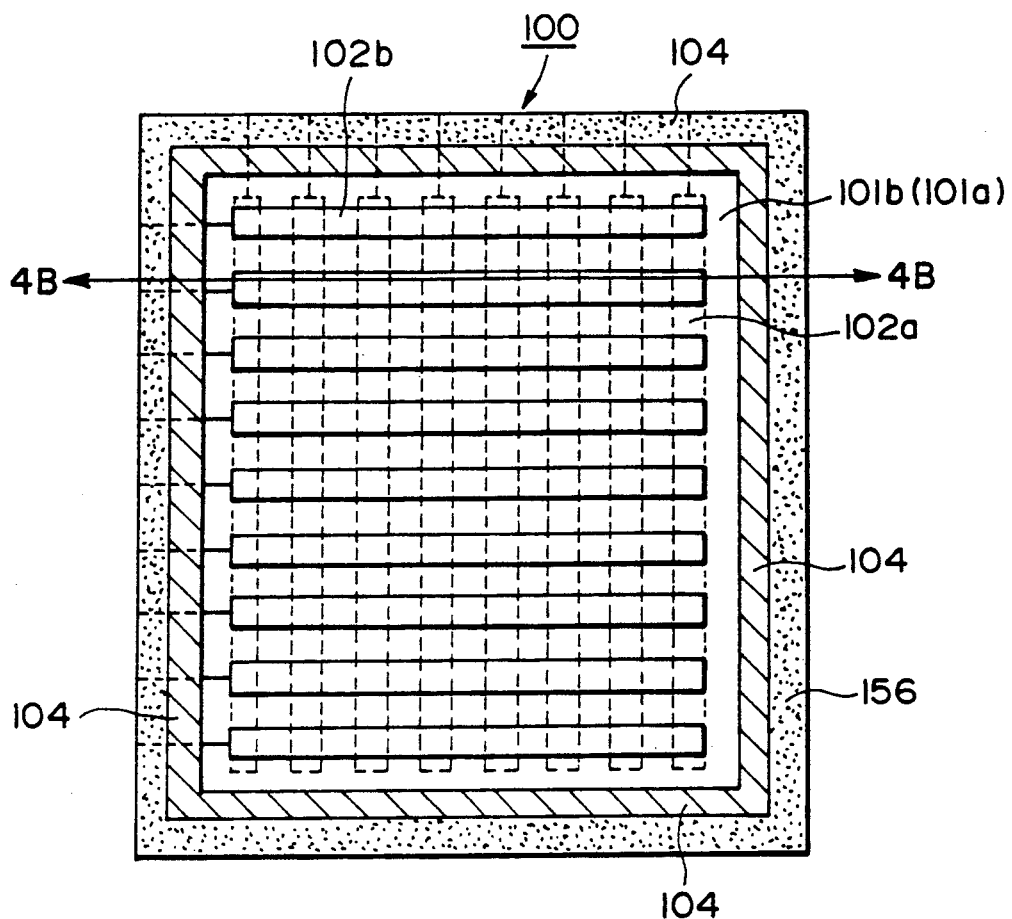
F I G. 4A
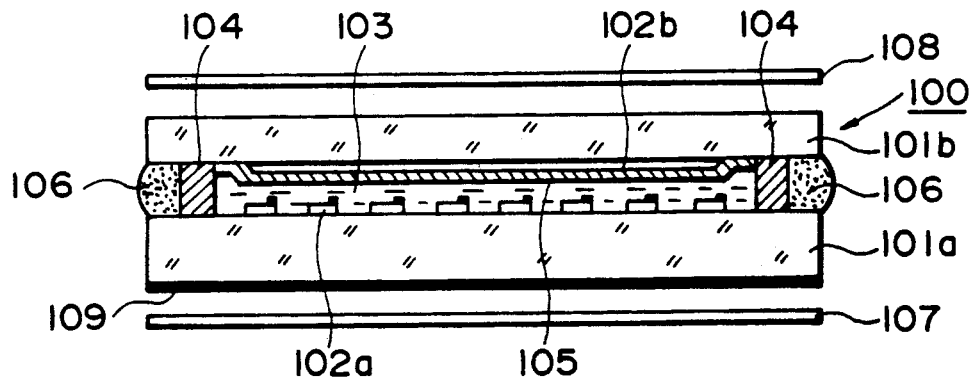
F I G. 4B

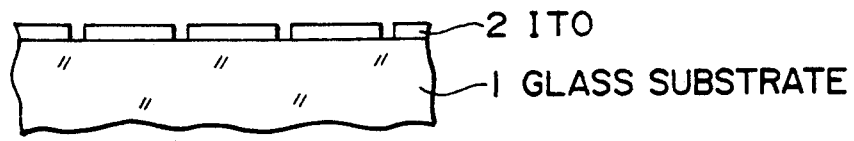
F I G. 8A
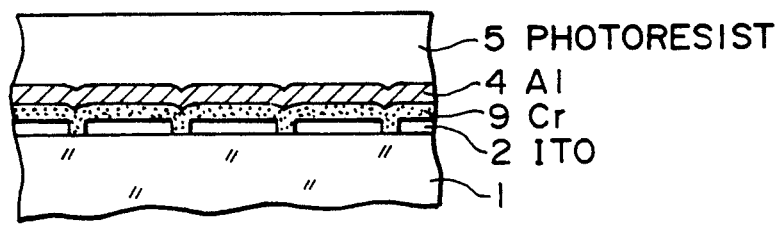
F I G. 8B
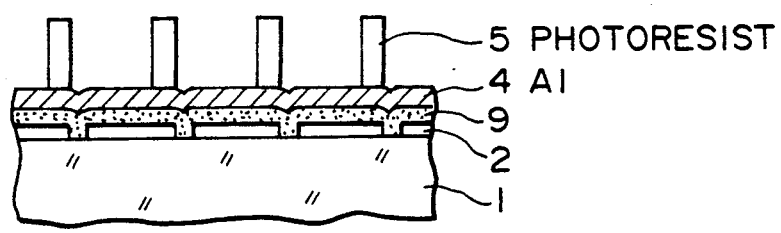
F I G. 8C
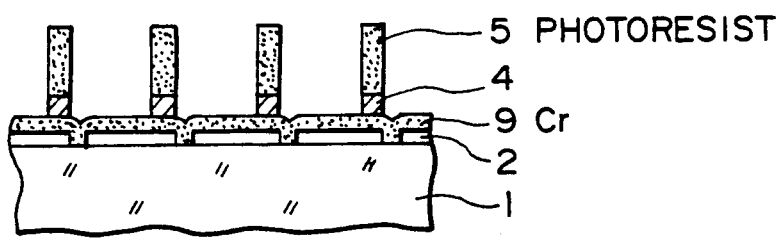
F I G. 8D
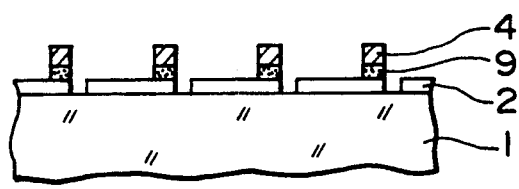
F I G. 8E

LIQUID CRYSTAL DEVICE AND DISPLAY APPARATUS WITH A THREE-LAYERED ELECTRODE OF ITO, MOLYBDENUM, AND ALUMINUM

FIELD OF THE INVENTION AND RELATED ART

The present invention relates to a liquid crystal device, particularly a device using a chiral smectic liquid crystal, and a display apparatus using such a device.

Hitherto, it has been practiced to use a laminar structure of an ITO (indium-tin-oxide) electrode and a metal wire so as to provide a lower resistivity electrode structure for a liquid crystal display device. As a metal constituting such a metal wire, there has been used a metal, such as Cr (chromium), Mo (molybdenum), W (tungsten) or Ni (nickel), which can be selectively etched in combination with ITO and can also be subjected to an ordinary photolithographic process. In recent years, however, there has been an increasing demand for liquid crystal display devices having a larger area and a higher resolution, and accordingly, the electrodes are required to have a further lower resistivity. For this reason, Al (aluminum) has been recently used as a metal wire because it shows a low resistivity, is inexpensive and is suited for fine processing.

However, when a laminate electrode structure of ITO and Al is formed by an ordinary lithographic process, there has been observed a difficulty that pinhole defects are liable to occur in the ITO film. This is explained with reference to FIGS. 7A–7D showing steps for production of such a conventional laminated electrode structure. First of all, a pattern of ITO electrode 2 is formed on a glass substrate 1 (FIG. 7A). Further, the ITO electrodes 2 are coated with an Al film 4 in a thickness of, e.g., 3000 Å and then with a positive-type photoresist layer 5 (FIG. 7B). Then, a prescribed Al pattern is formed by an ordinary photolithographic process wherein the Al film 4 is etched by a developing liquid containing principally an organic alkali. At this time, if there is any pinhole 7 in the Al film 4, ITO is also dissolved in the developing step due to nascent hydrogen generated when Al is dissolved (FIG. 7C). Then, when the ITO film is etched to form an electrode pattern, the portion of ITO film dissolved during the Al etching remains as a pinhole defect 8 to remarkably deteriorate the display quality of the resultant liquid crystal display device.

In order to obviate the above difficulty in the conventional process, it has been proposed to dispose a protective film between the ITO film and Al film. FIGS. 8A–8E illustrate such an embodiment for production of a laminated electrode structure having a first layer of ITO 2, a second layer of Cr 9 and a third layer of Al 4. The production process is similar to the one explained with reference to FIGS. 7A–7D except for the provision of the second Cr layer 9. It is also similar that the Al is partly preferentially dissolved during the developing step, but the occurrence of a pinhole in the ITO film is prevented due to the presence of the Cr layer 9 between the Al film 4 and the ITO film.

However, this process requires an additional etching step for the Cr film 9 (FIG. 8D) in addition to the Al etching step (FIG. 8C) and also the Cr film 9 is not always uniformly formed on the ITO film 2, so that complication of the process is inherently accompanied.

SUMMARY OF THE INVENTION

An object of the present invention is to provide a liquid crystal device and a display apparatus having solved the above-mentioned problems.

A more specific object of the present invention is to provide a liquid crystal device provided with electrodes with a reduced number of pinhole defects which are practically of no problem and a display apparatus using such a liquid crystal device.

According to the present invention, there is provided a liquid crystal device, comprising a pair of oppositely disposed electrodes, and a liquid crystal disposed between the electrodes; wherein at least one of the pair of electrodes comprises a laminated structure including a first layer of indium tin oxide, a second layer of molybdenum or its alloy, and a third layer of aluminum or its alloy, disposed in the order named.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4A is a schematic plan view of a ferroelectric liquid crystal device used in the invention, and FIG. 4B is a sectional view taken along the line A—A therein.

FIGS. 7A–7D and FIGS. 8A–8E respectively illustrate a conventional process for forming a laminated electrode structure on a substrate.

DESCRIPTION OF THE PREFERRED EMBODIMENTS

Figure 1A:
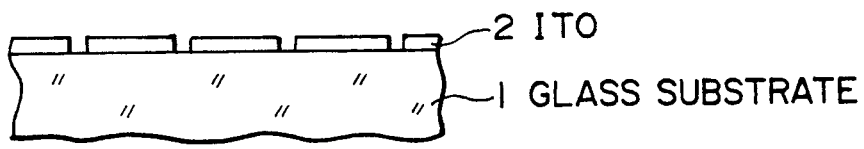
FIGS. 1A - 1E illustrate a process for forming a laminated electrode structure on a substrate used in an embodiment of the liquid crystal device according to the invention.

The device of the present invention has been provided so as to remote the defects of the above-mentioned conventional laminated electrode structure. More specifically, according to the present invention, a layer of Mo or Mo alloy is interposed between an ITO electrode constituting a display electrode and a layer of Al or Al alloy, whereby a low-resistivity electrode including Al can be realized without complicating the production process or causing pinhole defects in the ITO electrode.

A liquid crystal device according to the present invention may be formed by providing a pair of substrates having a display electrode having a laminated structure including a first layer of ITO, a second layer of Mo or Mo alloy disposed on the first layer, and a third layer of Al or Al alloy; subjecting the substrates to an aligning treatment; bonding the pair of substrates thus treated to each other with a gap therebetween; and filling the gap with a liquid crystal.

In the present invention, such a display electrode may be formed on a substrate, e.g., through a process including the steps of: forming a film of ITO by sputtering on the substrate, forming the ITO film into a pattern of stripes by ordinary photolithographic technique, forming thereon laminated films of Mo or Mo alloy and Al or Al alloy sequentially by sputtering similarly as the ITO film, coating the laminated films with a positive-type photoresist layer which is then exposed and developed into a pattern, etching the layers of Al or Al alloy and Mo or Mo alloy with an etchant comprising a predominant amount of phosphoric acid and relatively small amounts of nitric acid, acetic acid and water, and then peeling the remaining photoresist film.

The first layer of ITO (indium-tin-oxide) may suitably be a conventional one having an Sn content of 1-10 wt. % and may suitably have a thickness of 500 Å-5000 Å.

The second layer comprises Mo or Mo alloy. The Mo alloy may suitably be Mo-Ta, Mc-Ti, Mo-Si, Mo-Cr, Mo-V, Mo-Nb, Mo-W, Mo-Ta-Ti, Mo-Ta-Si, Mo-Ta-V, etc. Such an Mo alloy is suitably be used because the etching speed thereof can be controlled by varying the content of an alloying element, such as Ta, Ti, ..., etc. (FIG. 3) preferably in a proportion of 1-30 wt. %, more preferably 5-20 wt. %. It is particularly preferred to use Mo-Ta or Mo-Ti alloy with a preferred Ta- or Ti-content of 30 wt. % or less, further preferably be 5-15 wt. %.

The second layer of Mo or Mo alloy may be uniformly formed by vapor deposition on the ITO film and may desirably have a thickness of 50-2000 Å, preferably 300-1000 Å.

A layer of Al or Al alloy is formed on the second layer of Mo or Mo alloy. The Al alloy may for example be Al-Si, Al-Cu-Si or Al-Ti alloys containing at least one alloying element selected from Si, Cu and Ti in a proportion of 1-5 wt. %. The Al or Al alloy can further contain Mo or Cr in a proportion of 1-5 wt. %. The Al or Al alloy layer may suitably have a thickness of 50-2000Å, preferably 300-1000Å.

The liquid crystal used in the liquid crystal device may preferably be a ferroelectric liquid crystal which is not restricted to particular ones but can be selected from a wide scope.

Hereinbelow, the present invention will be described based on specific examples of production.

EXAMPLE 1

A laminated electrode structure was formed on a substrate through a process as illustrated in FIGS. 1A-1E.

First of all, a glass substrate 1 was coated with a 1000 Å-thick ITO film by sputtering, which ITO film was then patterned into stripes 2 by ordinary photolithographic technique (FIG. 1A).

Figure 1B:
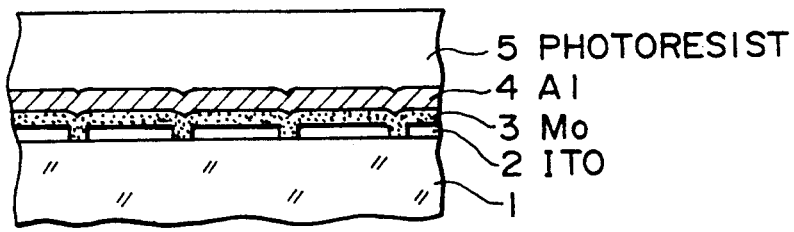
Figure 1C:
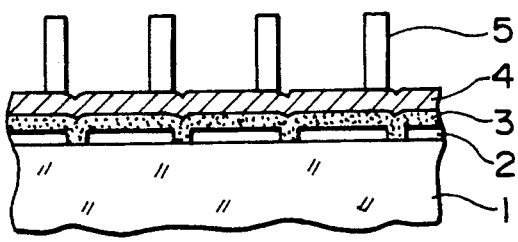

Then, the ITO stripes 2 were coated with laminated films including a 500 Å-thick Mo film 3 and a 3000 Å-thick Al film by sputtering similarly as the ITO film and then with a 1 micron-thick layer 5 of a positive-type photoresist (trade name: "OFPR-800", mfd. by Tokyo Ohka Kogyo K.K.) by using a roller coater (FIG. 1B). Then, the photoresist layer was exposed and then dipped in a developer liquid comprising principally an organic alkali (trade name: "NMD-3", mfd. by Tokyo Ohka Kogyo K.K.) to be patterned (FIG. 1C). In this step, Al 4 could be dissolved partly but the occurrence of pinholes in the ITO 2 was prevented due to the presence of the Mo film 2 between Al 4 and ITO 2 even if there were pinholes in the Al 4 film.

Figure 1D:
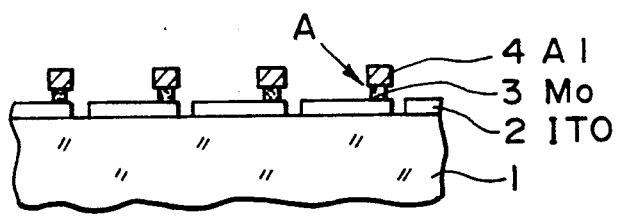
Figure 1E:
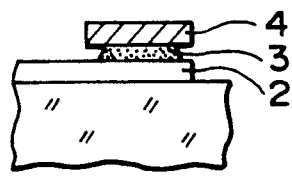

Then, the laminated films of Al 4 and Mo were etched by an etching liquid comprising a mixture of phosphoric acid (98 wt. %), nitric acid (60 wt. %), acetic acid (100 wt. %) and water in volumetric ratios of 16:1:2:1, and then the photoresist 5 was peeled to leave a laminated electrode structure (FIG. 1D). In this instance, Mo showed a larger etching speed than Al with respect to the above etching liquid, so that slight overhangs of Al electrode were formed as shown in FIG. 1E which is an enlarged view of a part A in FIG. 1D.

A pair of substrates each having thereon a laminated electrode structure thus formed were respectively subjected to an aligning treatment (including application of a polyimide film and rubbing of the polyimide film) and then bonded to each other with a gap therebetween, which was then filled with a ferroelectric chiral smectic liquid crystal (trade name: "CS-1014", mfd. by Chisso K.K.) to provide a liquid crystal display device. The liquid crystal display device resulted in alignment defects in the vicinity of the overhangs of Al electrodes, which were however so minute that they could be accepted without practical problem.

EXAMPLE 2

A laminated electrode structure was formed on a substrate through a process as shown in FIGS. 2A-2E, which was characterized by the use of an Mo-Ta alloy layer 6 as shown in FIGS. 2B-2E instead of the Mo layer 3 in Example 1.

Figure 2A:
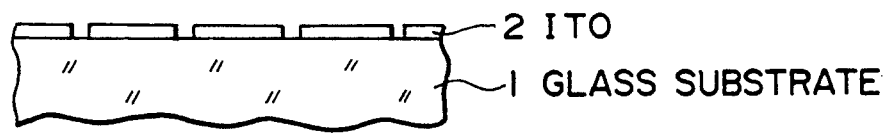
FIGS. 2A–2E illustrate a process for forming a laminated electrode structure on a substrate used in another embodiment of the liquid crystal device according to the invention.
Figure 2B:
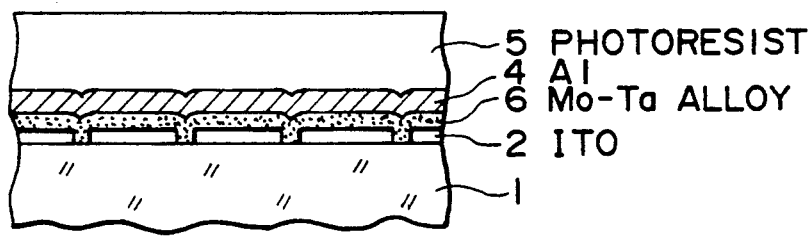
Figure 2C:
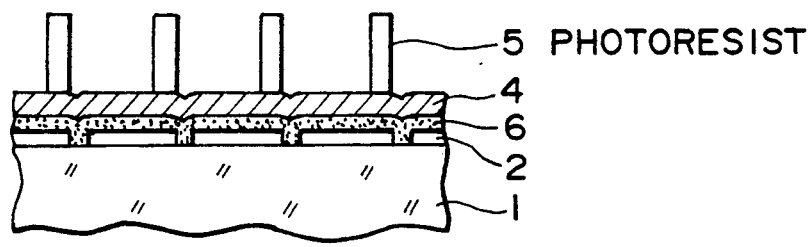
Figure 2D:
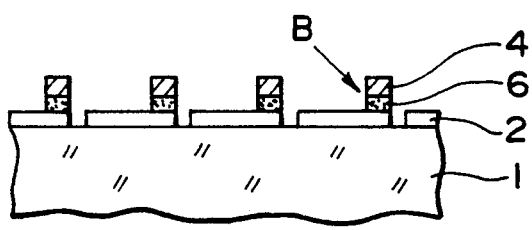
Figure 2E:
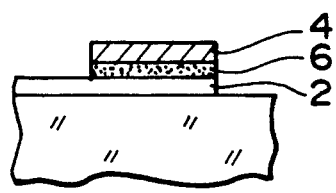
Figure 3:
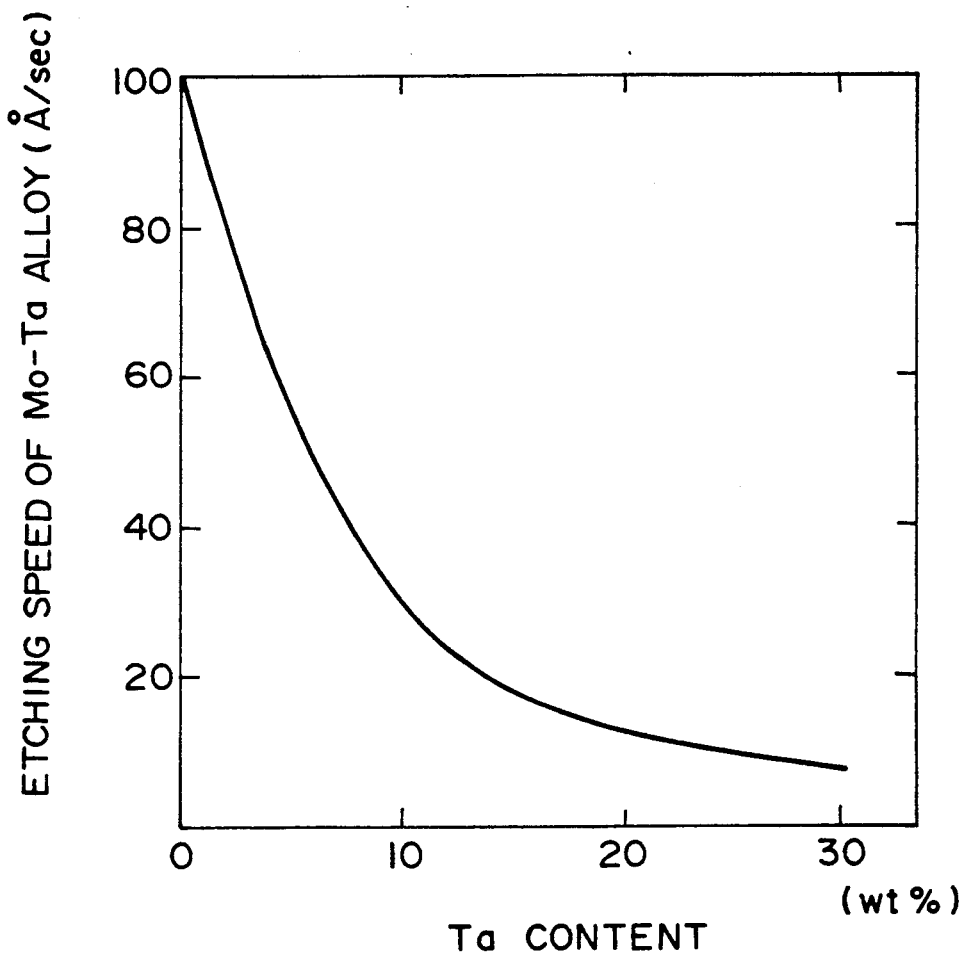
FIG. 3 is a graph showing a relationship between the etching speed of Mo - Ta alloy and the Ta content in the alloy.

As in Example 1, a pattern of ITO electrodes 2 was formed on a glass substrate 1 (FIG. 2A) and then coated with a 500 Å-thick film 6 of Mo-Ta alloy (Mo 92.5 wt. %, Ta 7.5 wt. %) and a 3000 Å-thick film 4 of Al, which were subjected to patterning in a similar process as in Example 1 (FIGS. 2B-2D). The etching speeds of Mo-Ta alloys were as shown in FIG. 3 and could be controlled varying the Ta contents in the alloys. In this Example, an Mo-Ta alloy containing 7.5 wt. % of Mo was used so as to provide an etching speed substantially identical to that of Al. As a result, it was possible to form an ideal laminated electrode structure free from overhangs of Al electrodes while preventing the occurrence of pinhole defects in the ITO electrodes 2 due to the presence of the Mo-Ta alloy layer 6. A part B in FIG. 2D is enlarged in FIG. 2E which shows that such an overhang of Al electrode was not formed.

A liquid crystal display device was prepared by using a pair of substrates thus processed otherwise in a similar manner as in Example 1. The display device provided a good display which was also free from alignment defects near the metal electrodes.

In the above Examples 1 and 2, Al electrodes were used as metal electrodes for providing a lower resistivity. It is however also possible to use an Al alloy such as Al-Si, Al-Si-Cu or Al-Ti in view of electro-migration and anti-corrosion characteristics. In this case, it is still possible to adjust the etching speed of Mo alloy to that of the Al alloy by changing the content of alloying element such as Ta or Ti, and also show the pinhole-preventing effect. These effects are applicable to any-types of liquid crystal display devices including STN, active matrix and ferroelectric chiral smectic liquid crystal devices.

FIGS. 4A and 4B illustrate an embodiment of the liquid crystal device according to the present invention. FIG. 4A is a plan view of the embodiment and FIG. 4B is a sectional view taken along the line 4B—4B in FIG. 4A.

A cell structure 100 shown in FIG. 4 comprises a pair of substrates 101a and 101b made of glass plates or plastic plates which are held with a predetermined gap with spacers 104 and sealed with an adhesive 106 to form a cell structure. On the substrate 101a is further formed an electrode group (e.g., an electrode group for applying scanning voltages of a matrix electrode structure) comprising a plurality of laminated electrodes 102a as formed by Example 1 above in a predetermined pattern, e.g., of a stripe pattern. On the substrate 101b is formed another electrode group (e.g., an electrode group for applying signal voltages of the matrix electrode structure) comprising a plurality of laminated electrodes 102b intersecting with the electrodes 102a.

On the substrate 101b provided with such electrodes 102b may be further formed an alignment control film 105 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The alignment control film 105 may be formed by first forming a film of an inorganic insulating material or an organic insulating material as described above and then rubbing the surface thereof in one direction with velvet, cloth, paper, etc.

In another preferred embodiment according to the present invention, the alignment control film 105 may be formed as a film of an inorganic insulating material such as SiO or $SiO_2$ on the substrate 101b by the oblique or tilt vapor deposition.

It is preferred that the alignment control film 105 also functions as an insulating film. For this purpose, the alignment control film may preferably have a thickness in the range of 100 Å to 1 micron, especially 500 to 5000 Å. The insulating film also has a function of preventing the occurrence of an electric current which is generally caused due to minor quantities of impurities contained in the liquid crystal layer 103, whereby deterioration of the liquid crystal compounds is prevented even on repeating operations.

The liquid crystal device according to the present invention can have an alignment control film similar to the above-mentioned alignment control film 105 also on the other substrate 101a.

The liquid crystal 103 in the cell structure 100 shown in FIG. 3 may assume an SmC* (chiral smectic C) or SmH* (chiral smectic H) phase. Such a liquid crystal layer assuming SmC* or SmH* may be formed by phase transition from cholesteric phase which is a higher temperature phase than the smectic phase, particularly cholesteric phase having a grandjean texture, through SmA (smectic A) phase to SmC* or SmH*.

The liquid crystal device further includes a sealant 106 composed of an epoxy adhesive, a pair of polarizers 107 and 108 disposed in cross nicols, and a heater 109 formed of a transparent resistor film (e.g., of $SnO_2$).

Figure 5:
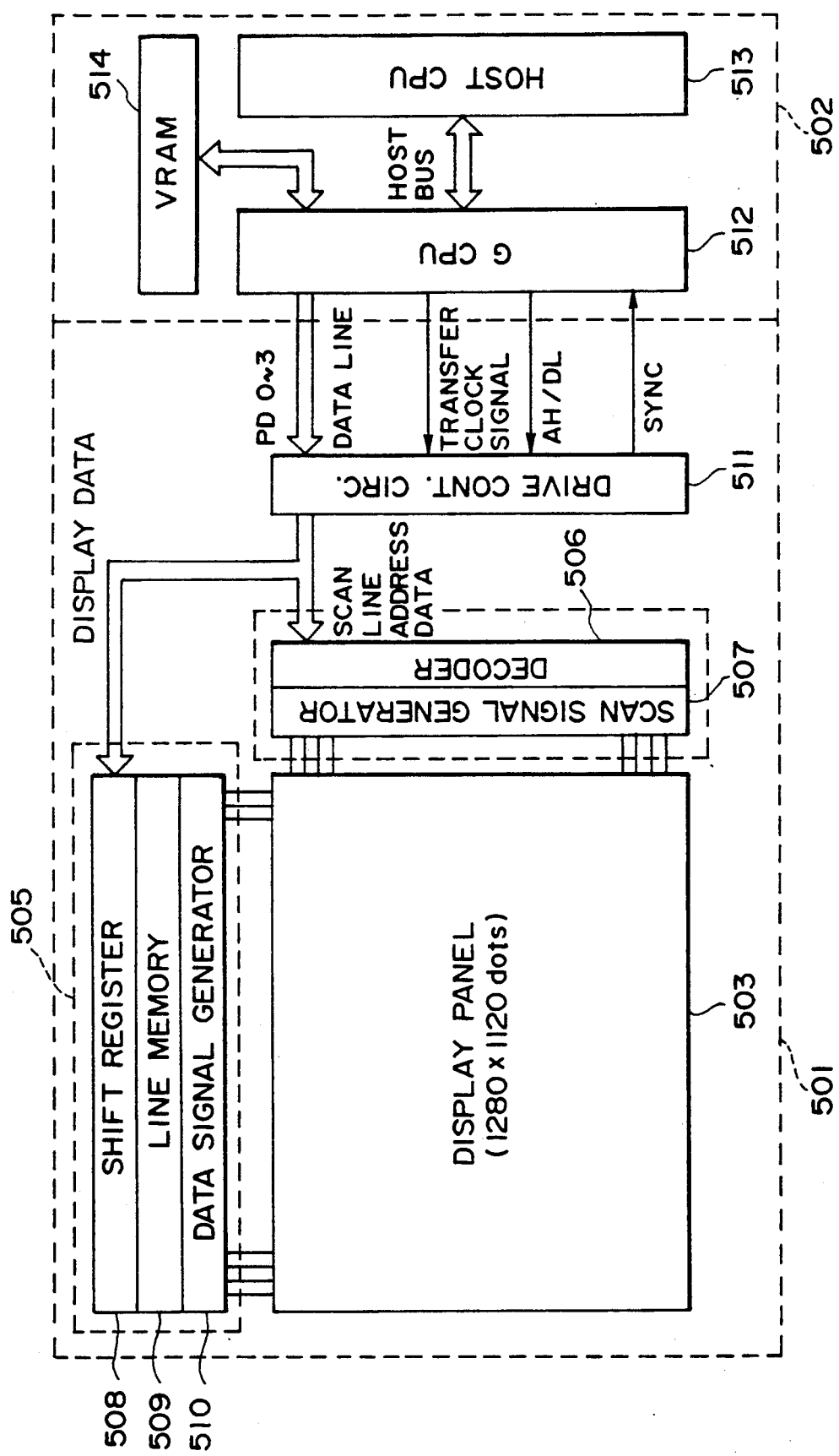
FIG. 5 is a block diagram of a liquid crystal display apparatus including a liquid crystal device and a graphic controller according to the invention.
Figure 6:
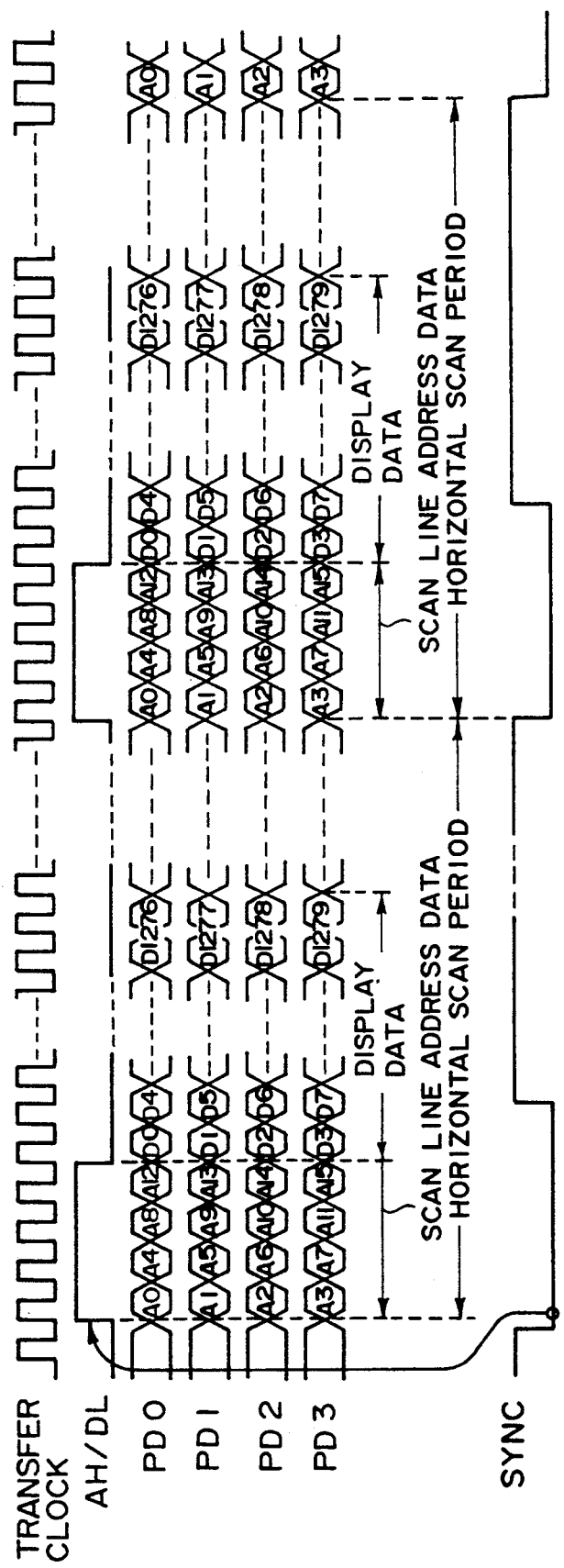
FIG. 6 is a time chart showing time correlation for image data communication between the liquid crystal device and the graphic controller.
Figure 7A:
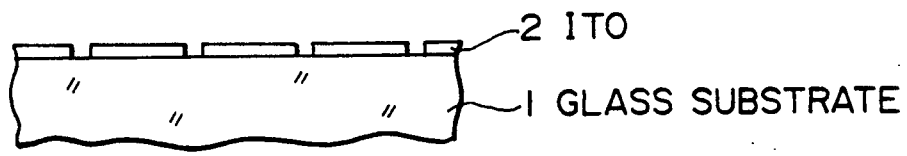
Figure 7B:
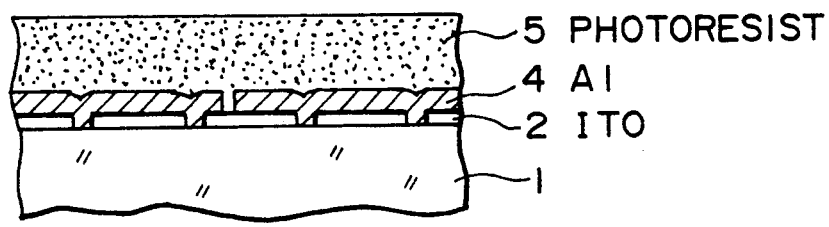
Figure 7C:
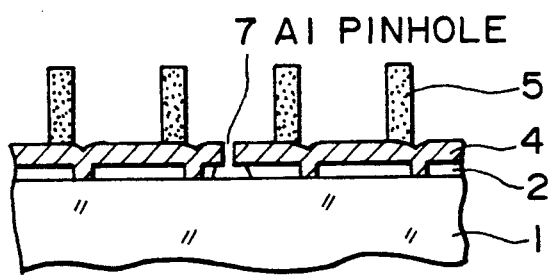
Figure 7D:
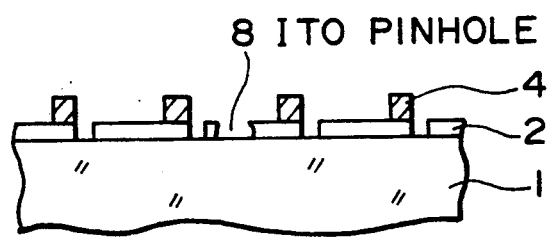

FIG. 5 is a block diagram showing an arrangement of a ferroelectric liquid crystal display apparatus 501 and a graphic controller 502 provided in an apparatus body of, e.g., a personal computer as a source of supplying display data. FIG. 6 is a time chart for communication of image data.

A display panel 503 (similar to a liquid crystal device 100 as described above) comprises a matrix electrode structure composed of 1120 scanning electrodes and 1280 data electrodes respectively disposed on a pair of glass plates and subjected to an aligning treatment, and a ferroelectric liquid crystal disposed between the glass substrates. The scanning electrode (lines) and data electrodes (lines) are connected to a scanning line drive circuit 504 and a data line drive circuit 505, respectively.

Hereinbelow, the operation will be explained with reference to the figures. The graphic controller 502 supplies scanning line address data for designating a scanning line and image data (PD0–PD3 on the scanning line designated by the address data to a display drive circuit 504/505 (composed of a scanning line drive circuit 504 and a data line drive circuit 505) of the liquid crystal display apparatus 501. In this embodiment, the image data comprising the scanning line address data and the display data are transferred through the same transmission line, so that it is necessary to differentiate the above-mentioned two types of data. For the differentiation, a signal AH/DL is used. The AH/DL signal at a high level means scanning line address data, and the AH/DL signal at a low level means display data.

In the liquid crystal display apparatus 501, the scanning line address data are extracted from transferred image data PD0–PD3 by a drive control circuit 511 and then supplied to the scanning line drive circuit 504 in synchronism with a time for driving a designated scanning line. The scanning line address data are inputted to a decoder 506 in the scanning line drive circuit 504, and a designated scanning line in the display panel 503 is driven by a scanning signal generating circuit 507 with the aid of the decoder 506. On the other hand, the display data are introduced to a shift register 508 in the data line drive circuit 505 and shifted by a unit of 4 pixel data based on a transfer clock signal. When the shift of display data for one horizontal scanning line is completed by the shift register 508, the display data for 1280 pixels are transferred to a line memory disposed in parallel, memorized for a period of one horizontal scanning and are supplied to the respective data lines as display data signals through a data signal generating circuit 510.

Further, in this embodiment, the drive of the display panel 503 in the liquid crystal display apparatus 501 is not synchronized with the generation of the scanning line address data and display data in the graphic controller 502, so that it is necessary to synchronize the apparatus 501 and 502 at the time of image data transfer. A signal SYNC is in charge of the synchronization and is generated in the drive control circuit 511 in the liquid crystal display apparatus 501 at each one horizontal scanning period. The graphic controller 502 always monitors the SYNC signal, and transfers image data when the SYNC signal is at a low level and does not effect transfer after completing transfer of image data for one horizontal scanning line when the SYNC signal is at high level. More specifically, referring to FIG. 6, the graphic controller 502 immediately sets the AH/DL signal at high level and starts transfer of image data for one horizontal scanning line when it detects that the SYNC signal is at low level. The drive control circuit 511 in the liquid crystal display apparatus 501 set to the SYNC signal at high level during the image data transfer period. When the writing in the display panel 503 is completed after a prescribed one horizontal scanning period, the drive controller circuit (FLCD controller) 511 returns the SYNC signal to the low level so that it can receive image data for a subsequent scanning line.

As described above, according to the present invention, a display electrode is constituted as a laminated structure including a second layer of Mo or Mo alloy between a first layer of ITO and a third layer of Al or Al alloy, whereby a liquid crystal display device having a low-resistivity electrode structure with the aid of an Al electrode without complicating the production process or causing pinhole defects in the ITO electrodes.

What is claimed is:

1. A liquid crystal device, comprising:
   a pair of oppositely disposed electrodes; and
   a liquid crystal disposed between the electrodes,
   wherein at least one of the pair of electrodes comprises a laminated structure including a first layer of indium tin oxide, a second layer of molybdenum or a molybdenum alloy, and a third layer of aluminum or an aluminum alloy disposed in the named order, wherein said second and third layers cover only a part of said first layer and
   wherein said third layer is formed of an alloy comprising aluminum and at least one alloying element selected from the group consisting of silicon, copper and titanium.

2. A liquid crystal device, comprising:
   a pair of oppositely disposed electrodes; and
   a liquid crystal disposed between the electrodes,
   wherein at least one of the pair of electrodes comprises a laminated structure including a first layer of indium tin oxide, a second layer of molybdenum or a molybdenum alloy, and a third layer of aluminum or an aluminum alloy disposed in the named order, wherein said second and third layers cover only a part of said first layer and
   wherein said third layer has a thickness of 50–2,000 Å.

3. A liquid crystal device, comprising:
   a pair of oppositely disposed electrodes; and
   a liquid crystal disposed between the electrodes,
   wherein at least one of the pair of electrodes comprises a laminated structure including a first layer of indium tin oxide, a second layer of molybdenum or a molybdenum alloy, and a third layer of aluminum or an aluminum alloy disposed in the named order, wherein said second and third layers cover only a part of said first layer and
   wherein said third layer has a thickness of 100–1,000 Å.

4. A device according to any one of claims 1-3, wherein said second layer is formed of an alloy comprising molybdenum and at least one alloying element selected from the group consisting of tantalum, silicon, chromium, vanadium, niobium and tungsten.

5. A device according to any one of claims 1-3, wherein said second layer is formed of an alloy comprising molybdenum and tantalum.

6. A device according to claim 5, wherein said tantalum is contained in a proportion of 30 wt. % or less of the alloy.

7. A device according to any one of claims 1-3, wherein said second layer is formed of an alloy comprising molybdenum and titanium.

8. A device according to claim 7, wherein said titanium is contained in a proportion of 30 wt. % or less of the alloy.

9. A device according to any one of claims 1-3, wherein said second layer has a thickness of 50–2000 Å.

10. A device according to any one of claims 1-3, wherein said second layer has a thickness of 300–1000 Å.

11. A device according to any one of claims 1-3, wherein said liquid crystal is a chiral smectic liquid crystal.

12. A display apparatus, comprising:
    (a) a liquid crystal device comprising (i) a first substrate having thereon first electrodes having a laminated structure including a first layer of indium tin oxide, a second layer of molybdenum or a molybdenum alloy, and a third layer of aluminum or an aluminum alloy having a thickness of 50–2,000 Å, disposed in the named order, wherein said second and third layers cover only a part of said first layer; (ii) a second substrate having thereon second electrodes disposed opposite to the first electrodes; and (iii) a liquid crystal disposed between the first and second substrates;
    (b) a first means for supplying signal voltages to the first electrodes and the second electrodes, and
    (c) a second means for controlling the first means.

13. An apparatus according to claim 12, wherein the first electrodes are disposed in the form of stripes, the second electrodes are disposed in the form of stripes intersecting the first electrodes, and in each of the first electrodes, the second and third layers are thinner in width than the first layer and disposed along the length of the stripe of the first layer.

14. An apparatus according to claim 13, wherein the second and third layers are disposed along a longitudinal edge of the stripe of the first layer.

15. An apparatus according to claim 12, wherein said liquid crystal is a chiral smectic liquid crystal.

* * * * *